Oct. 18, 1927.

W. S. AUSTIN 1,646,180

SPRING SUSPENSION FOR VEHICLES

Original Filed March 30, 1920

Inventor
Walter S. Austin

By Frank E. Liurance jr.
Attorneys

Patented Oct. 18, 1927.

1,646,180

UNITED STATES PATENT OFFICE.

WALTER S. AUSTIN, OF GRAND RAPIDS, MICHIGAN.

SPRING SUSPENSION FOR VEHICLES.

Application filed March 30, 1920, Serial No. 369,945. Renewed April 4, 1927.

This invention relates to a spring suspension for vehicles, and is concerned with various improvements in the construction of springs which make them particularly applicable to motor vehicles.

A primary object and purpose of the present invention is to provide an improved spring suspension for vehicles, particularly, motor vehicles, which will secure very easy riding qualities for the vehicle, and with which a greater flexibility is obtained between the rear axle of the vehicle and the body which is supported by the spring suspension, thus eliminating certain strains to which the spring suspension has heretofore been subjected, and lessening the possibilities of breakage of the springs due to such strains.

Figure 1:
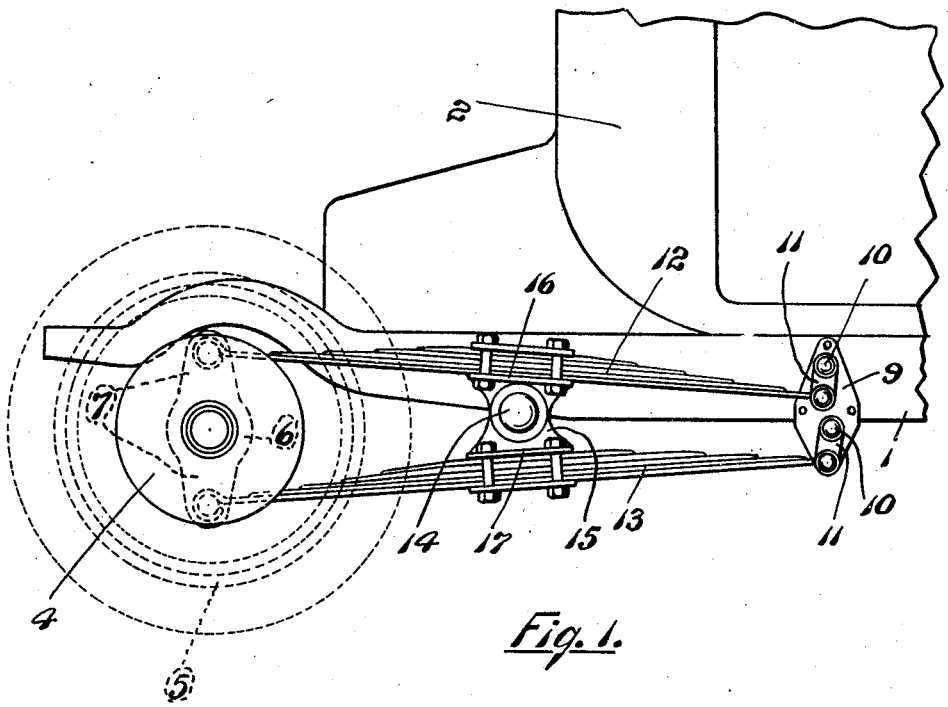
Figure 2:
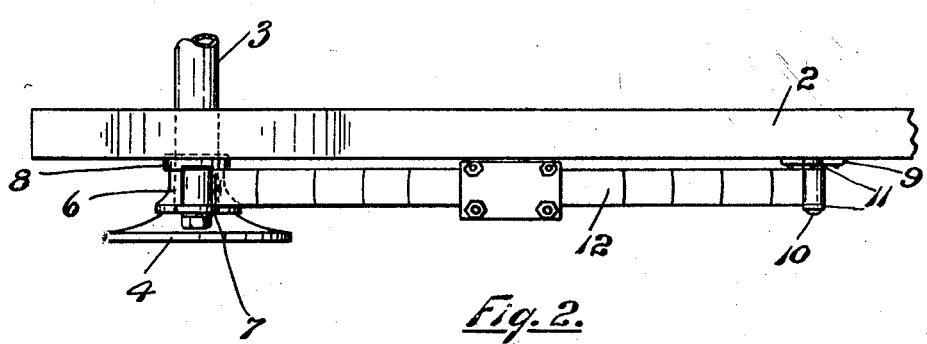

Further objects and purposes, the same relating to details and economies of construction and operation will appear fully in the following description, taken in connection with the accompanying drawing, in which;

Fig. 1 is a side view of an automobile equipped with the improved spring suspension construction, the forward part of the chassis and body being broken away, and the rear wheel being shown in dotted lines, and Fig. 2 is a plan view showing the connections of one of the springs of the spring suspension at one side of the vehicle.

In the drawing, like reference characters refer to like parts in the two figures.

The automobile chassis includes the usual side frame members 1 which support the body 2. The rear axle 3 may be equipped at its ends with brake drums 4, the part 3 being a housing for the shafts housed within and to the ends of which the rear wheels 5, indicated in dotted outlines, are attached.

On each end of the rear axle housing 3 near the brake flange 4 a member 6 is mounted to swivel about the longitudinal axis of the rear axle housing, this member 6 preferably having arms 7 extending in opposite directions above and below the central portion which is loosely mounted on the axle housing. I have shown said member 6 as located between a collar 8 and a brake flange 4, the collar being fixed on the rear axle housing in any preferred manner. This construction is only illustrative of one way that the swivelled member may be mounted, however, and my invention is not limited in any way to the specific construction shown and described.

A distance ahead of the rear axle, each chassis frame member 1 has a plate 9 secured thereto. From said plate two studs 10 project. Shackle links 11 are pivotally connected to and depend from the studs, and to the lower ends of the shackle links the forward ends of two cantilever springs 12 and 13 are connected. Spring 12 lies directly over spring 13 and its rear end is connected to the upwardly extending arm 7 of the swivelled member 6, while the rear end of the lower spring 13 has like connection to the lower end of the downwardly extending arm 7 of said member 6, as shown.

A stud 14 is fixed to the chassis frame 1 and is located between the two springs 12 and 13 and a block 15 is pivoted between its ends thereon and each upper and lower end of said block terminates in a ledge 16 against which the underside of the upper spring 12 and the upper side of the lower spring 13 bear. The springs are permanently connected to said ledges by means of suitable clips and bolts 17, though any suitable form of permanent connection may be used.

By means of my improved spring suspension, using one of the double cantilever springs at each side of the vehicle, I am enabled to secure many advantages, including much better riding qualities for the vehicle, a double insurance against disabling the vehicle for travel from breakage of springs, lighter springs without sacrifice of strength, this giving easier riding, elimination of side sway, while the swivelled connection of the member 6 on the rear axle housing, to which the rear ends of the springs 12 and 13 are connected, gives a greater range for the springs and permits their flexing without development of undue strains which might otherwise result in breakage of at least one of the springs; and the diverging of the springs to the rear with the attachment of the rear ends thereof at a considerable distance from the axis of the rear axle, with the front ends of the springs approaching each other further increases the easy riding qualities of the spring construction and gives greater spring efficiency thereto.

While I have shown and described a detailed construction, it is evident that it is susceptible of considerable variation in detail, and I, accordingly, do not wish to be restricted to the exact specific details but consider myself entitled to all modifications which fall within the scope of the appended claims defining the invention.

I claim:

1. In a spring suspension for vehicles, the combination with a chassis frame, rear axle and rear axle housing, of a member secured to the frame, a pair of shackle links pivotally mounted on said member, a member swivelly mounted on the rear axle housing, a pair of cantilever springs disposed one above the other, said springs being connected at their front to the shackle links and diverging rearwardly therefrom to points above and below the rear axle housing and having connection to said swivelled member at their rear ends, a block interposed between the middle portions of the springs, and means rigidly securing said springs to said block, substantially as and for the purposes described.

2. In a spring suspension for vehicles, the combination with the chassis frame, rear axle, rear axle housing and brake flange, of a member mounted to turn about the longitudinal axis of the rear axle housing and having parts extending above and below said housing, a second member secured to the chassis frame, shackle links pivotally connected to said second member, a pair of cantilever springs connected at their front ends to said links and diverging rearwardly therefrom to above and below the rear axle housing and connected at their rear ends to said first member, and means rigidly connecting the springs substantially at their middle portions, substantially as and for the purposes described.

3. In a spring suspension for vehicles, the combination with the chassis frame, rear axle, rear axle housing and brake flange, of a member located closely adjacent the brake flange and mounted loosely on the rear axle housing to turn about the same, means for holding said member from lengthwise movement along the rear axle housing, a second member secured to the chassis frame, shackle links pivotally connected to said second member, a pair of cantilever springs connected at their front ends to said links and at their rear ends to said first member at points above and below said rear axle housing, a block disposed between springs substantially at the middle portions thereof, and means connecting the springs to the blocks, substantially as and for the purposes described.

4. In a spring suspension for vehicles, the combination of chassis frame and rear axle housing, of a member loosely mounted on the rear axle housing and extending above and below the same, a pair of cantilever springs located one over the other and connected at their rear ends to said member at points above and below the rear axle housing, means for connecting the front ends of the springs to the chassis frame whereby the front ends of the springs may have movement for a limited distance lengthwise of the chassis frame, and means pivotally connecting the springs to the chassis frame, substantially at their middle portions, substantially as described.

5. In a spring suspension for vehicles, the combination of chassis frame and rear axle housing, of pairs of cantilever springs located at each side of the frame, means connecting the forward ends of the springs to the side frame members, means loosely mounted on and adjacent each end of the rear axle housing and extending above and below the housing, means connecting the rear ends of the springs to said loosely mounted means, the rear ends of one of each pair of springs being attached above the rear axle housing and the other below, and means pivotally connecting the springs of each pair of springs to each respective side of the frame substantially at their middle portions, substantially as described.

6. In a spring suspension for vehicles, the combination of chassis and rear axle housing, of a pair of rearwardly diverging cantilever springs located one over the other and having means pivotally connecting the same to the chassis frame adjacent their middle portions, means connecting the front ends of said springs to the chassis frame, and means to which the rear ends of said springs are connected mounted on the rear axle housing and adapted to turn about the longitudinal axis thereof, substantially as described.

7. In a spring suspension for vehicles, the combination of chassis frame and rear axle housing, of a member loosely mounted to turn about the longitudinal axis of the rear axle housing and extending above and below said housing, a pair of cantilever springs connected at their rear ends to said member at points above and below the housing, means comprising a block located between the springs substantially at their middle portions and rigidly attached thereto, said block being pivotally mounted on said chassis frame, and means for connecting the front ends of said springs to the chassis frame, substantially as and for the purposes described.

8. In a spring suspension for vehicles, the combination of chassis frame and rear axle housing, of a member loosely mounted on the rear axle housing to turn about the same, said member having parts extending above and below the housing, a pair of cantilever springs disposed one over the other and connected at their rear ends to said member at points above and below the rear axle housing, means pivotally connecting the springs to the chassis frame substantially at their middle portions, and means movably connecting the front ends of the springs to the chassis frame, substantially as described.

9. In a spring suspension for vehicles, the combination of chassis frame and rear axle housing, of a member loosely mounted on and adjacent each end of the housing and extending above and below said housing, a pair of cantilever springs located one over the other at each side of the chassis frame, means movably connecting the front ends of said springs to the side members of the chassis frame, the rear ends of the springs being connected to said loosely mounted members at points above and below the rear axle housing, a block located between each of the pairs of springs substantially at the middle portions thereof and pivotally mounted on the chassis frame, and means rigidly connecting the springs to the blocks, substantially as described.

In testimony whereof I affix my signature.

WALTER S. AUSTIN.